(No Model.)

12 Sheets—Sheet 1.

T. C. DEXTER.
BOOK COLLATING MACHINE.

No. 591,094. Patented Oct. 5, 1897.

WITNESSES:
H. B. Smith
J. J. Laass

INVENTOR:
Talbot C. Dexter
By E. Laass
his ATTORNEY (No Model.) 12 Sheets—Sheet 2.

T. C. DEXTER.
BOOK COLLATING MACHINE.

No. 591,094. Patented Oct. 5, 1897.

WITNESSES:
C. L. Bendixon
J. J. Laass

INVENTOR
Talbot C. Dexter
By E. Laass
his ATTORNEY

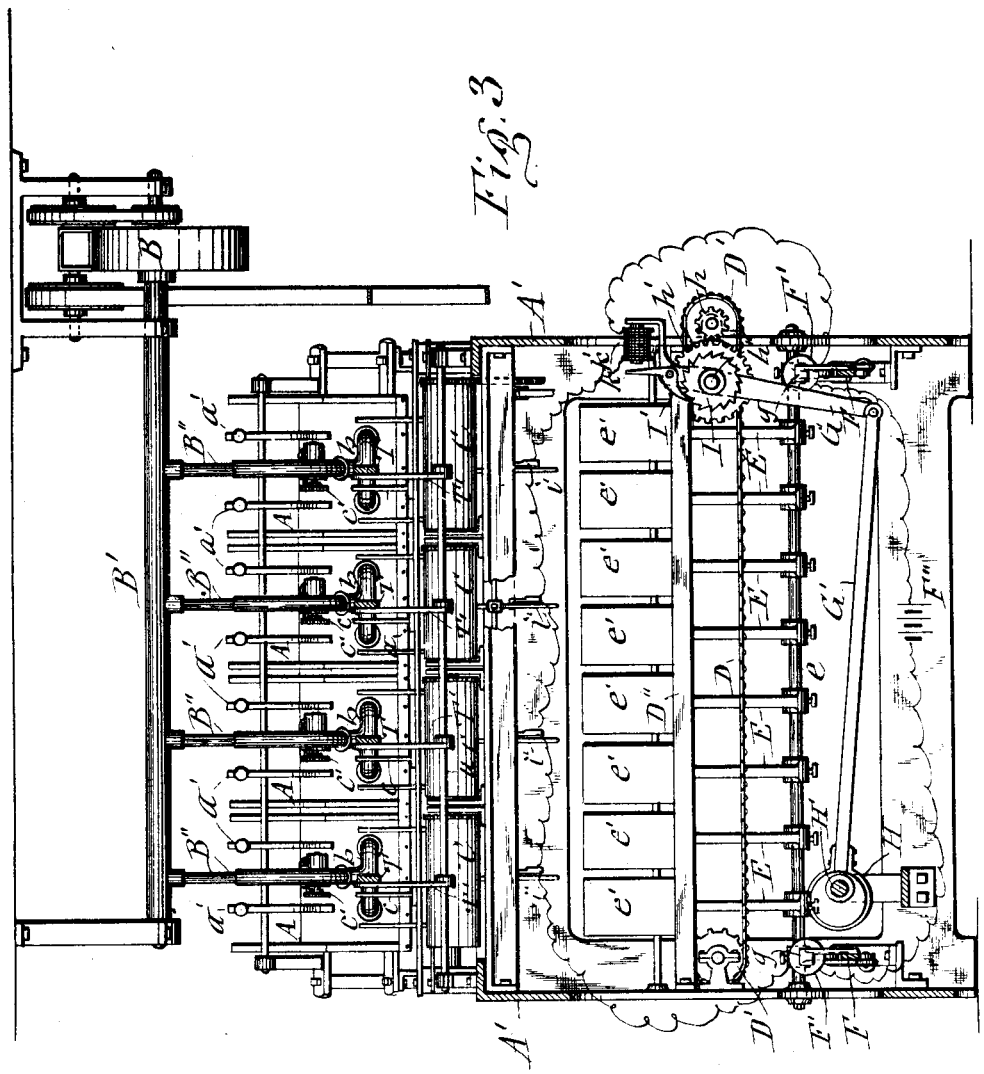

(No Model.)  
12 Sheets—Sheet 4.
T. C. DEXTER.
BOOK COLLATING MACHINE.
No. 591,094. Patented Oct. 5, 1897.
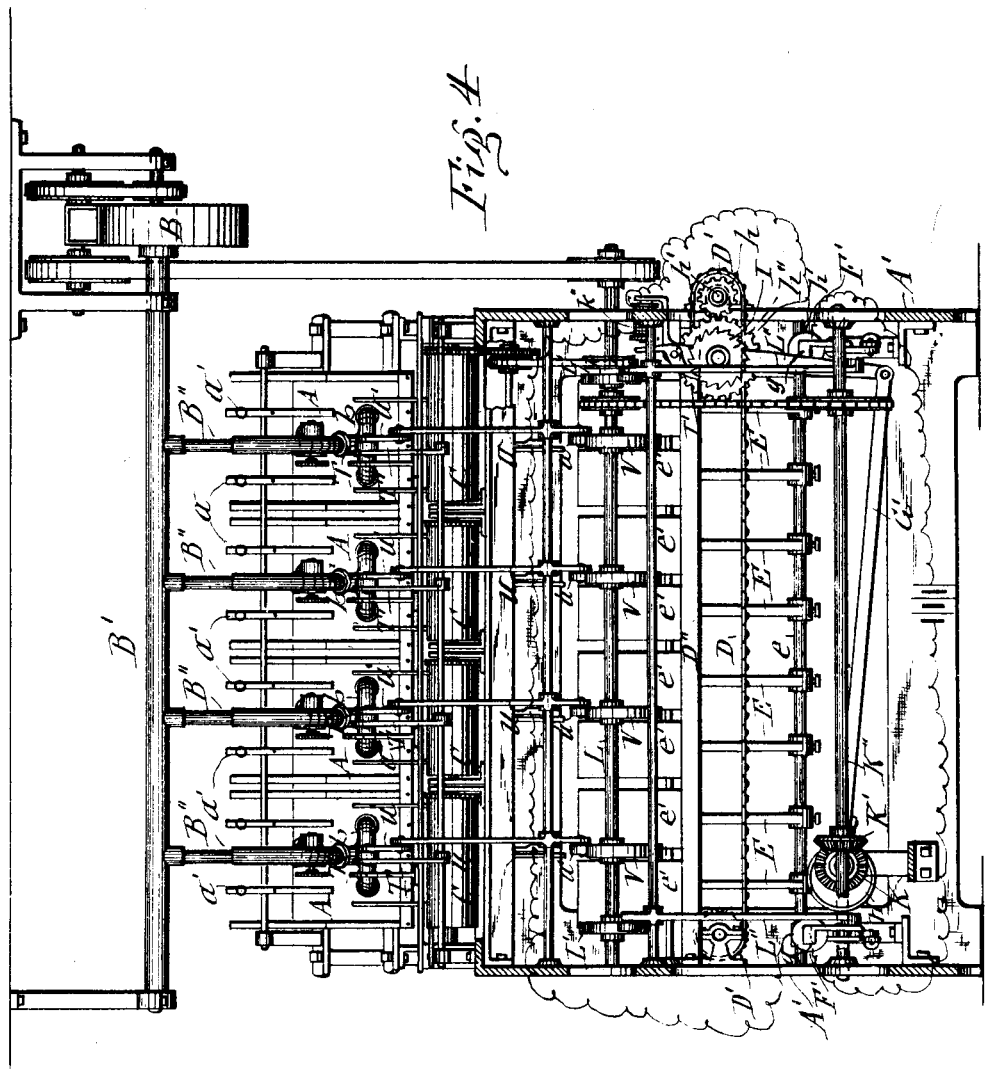
WITNESSES:
C. L. Bendixon
J. J. Laass
INVENTOR
Talbot C. Dexter
By E. Laass
his ATTORNEY

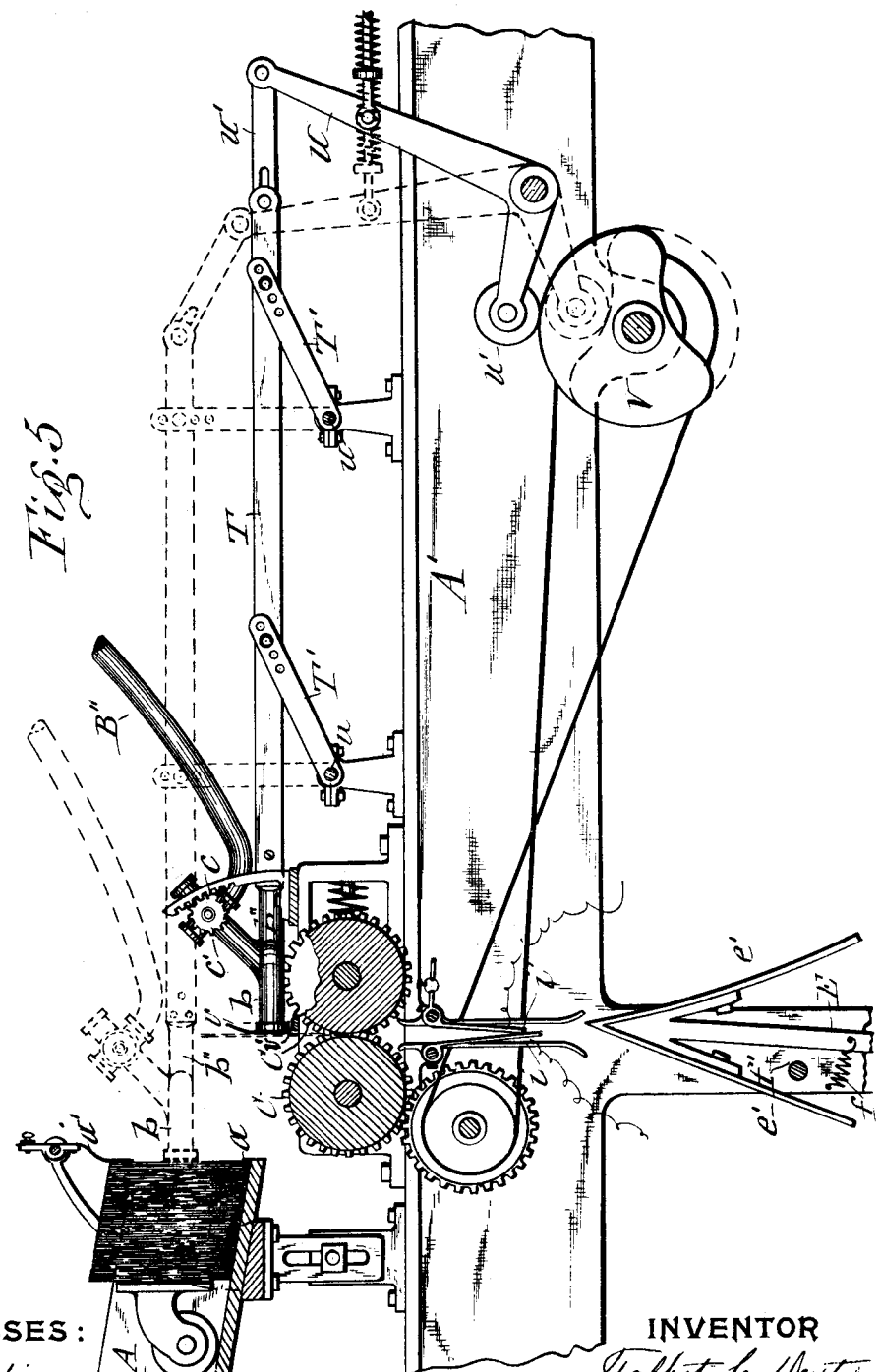

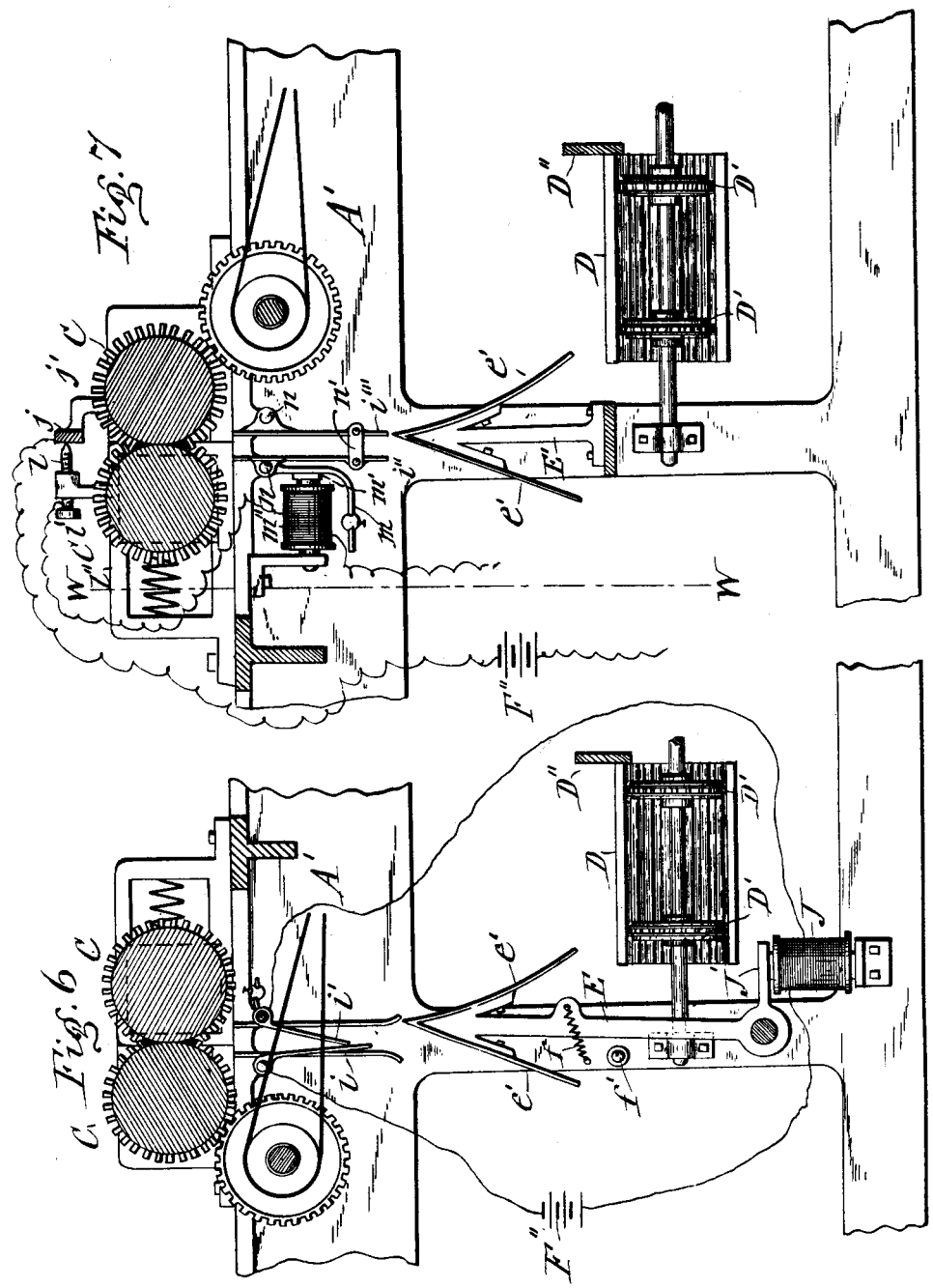

(No Model.) 12 Sheets—Sheet 7.

T. C. DEXTER.
BOOK COLLATING MACHINE.

No. 591,094. Patented Oct. 5, 1897.

WITNESSES:
C. L. Bendixen
J. J. Laass

INVENTOR
Talbot C. Dexter
By E. Laass
his ATTORNEY (No Model.)  12 Sheets—Sheet 8.
T. C. DEXTER.
BOOK COLLATING MACHINE.
No. 591,094. Patented Oct. 5, 1897.
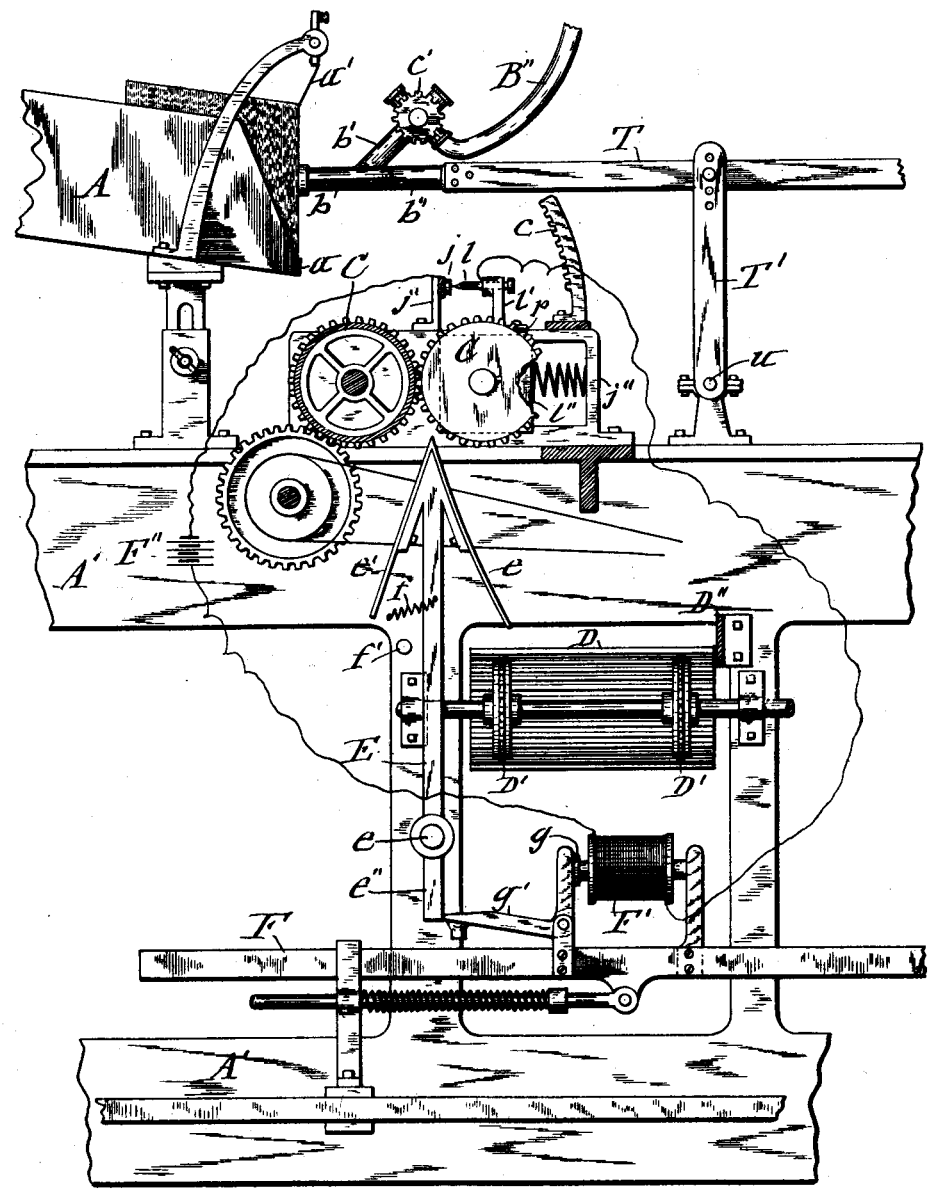
Fig. 8½
WITNESSES:
H. B. Smith
J. J. Laass
INVENTOR:
Talbot C. Dexter
By E. Laass
his ATTORNEY

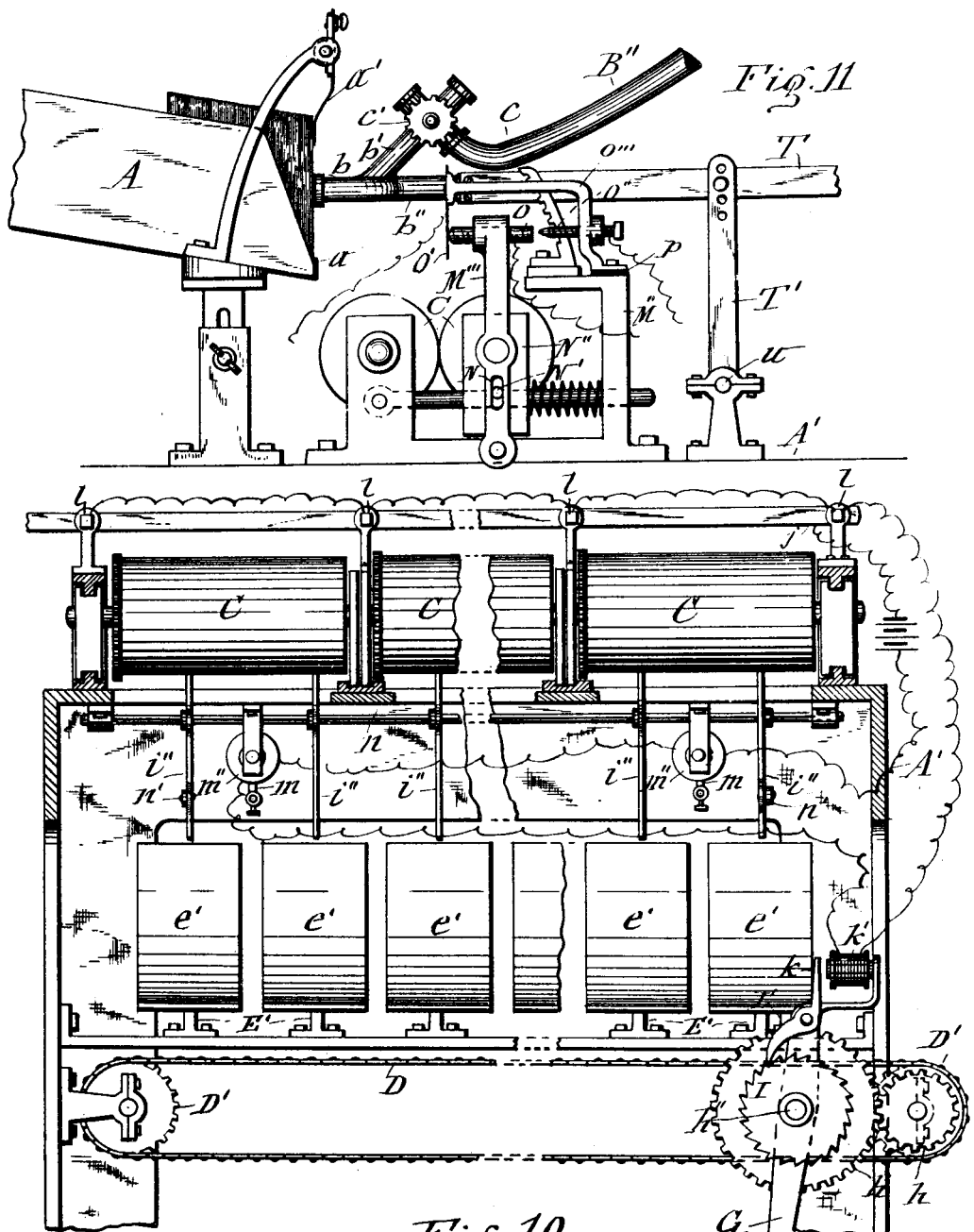

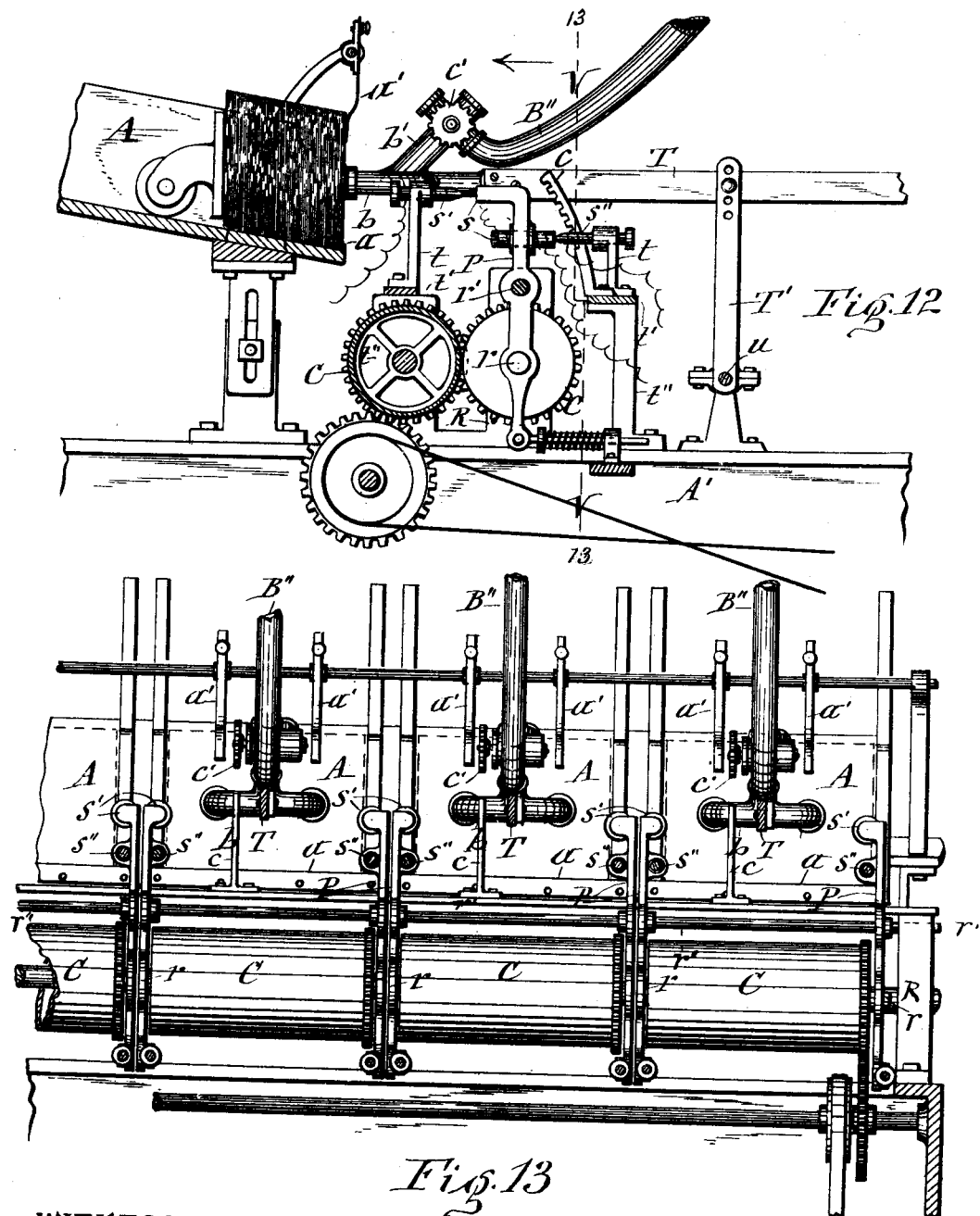

(No Model.)
T. C. DEXTER.
BOOK COLLATING MACHINE.
No. 591,094.
12 Sheets—Sheet 11.
Patented Oct. 5, 1897.
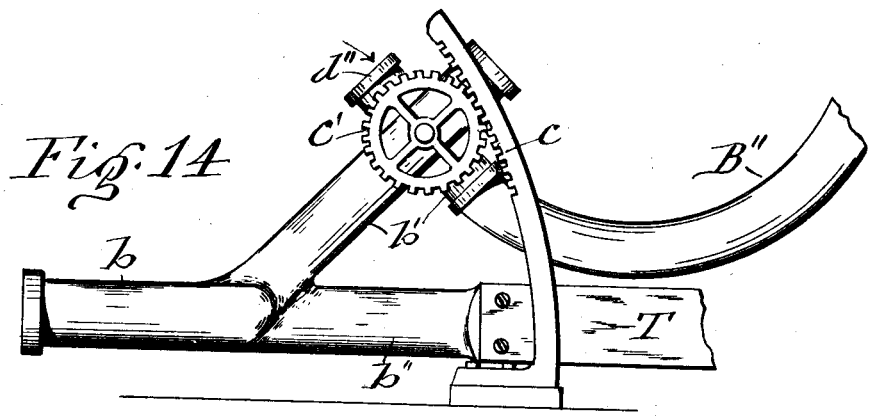
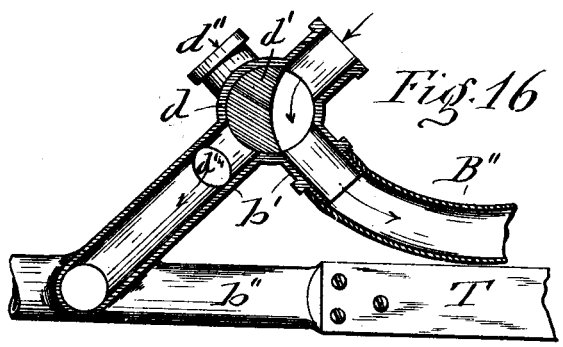
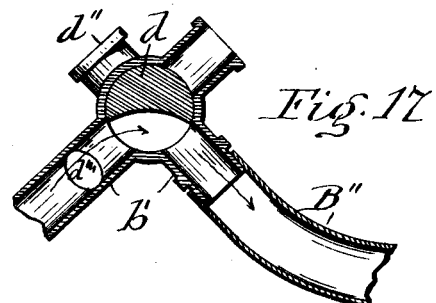
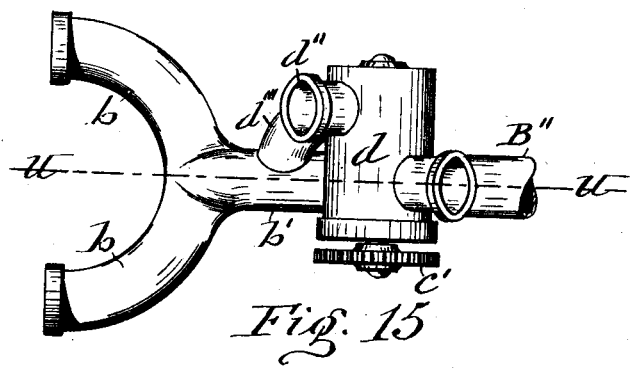
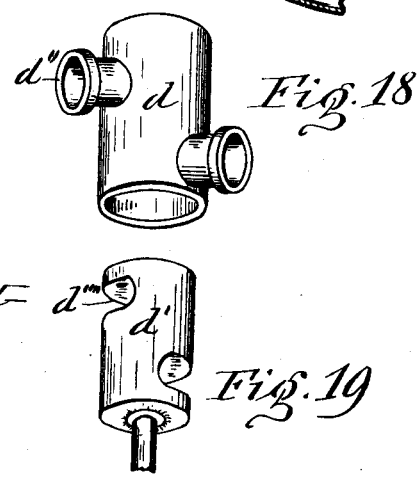
WITNESSES:
C. L. Bendixon
J. J. Laas
INVENTOR
Talbot C. Dexter
By E. Laas
his ATTORNEY (No Model.)    T. C. DEXTER.    12 Sheets—Sheet 12.
BOOK COLLATING MACHINE.
No. 591,094.    Patented Oct. 5, 1897.

WITNESSES:
H. B. Smith
J. J. Laass

INVENTOR:
Talbot C. Dexter
By E. Laass
his ATTORNEY

UNITED STATES PATENT OFFICE.

TALBOT C. DEXTER, OF PEARL RIVER, NEW YORK.

BOOK-COLLATING MACHINE.

SPECIFICATION forming part of Letters Patent No. 591,094, dated October 5, 1897.

Application filed April 10, 1896. Serial No. 586,963. (No model.)

*To all whom it may concern:*

Be it known that I, TALBOT C. DEXTER, of Pearl River, in the county of Rockland, in the State of New York, have invented new and useful Improvements in Book-Collating Machines, of which the following, taken in connection with the accompanying drawings, is a full, clear, and exact description.

My present invention relates more particularly to the collating-machine shown and described in my application for Letters Patent, Serial No. 593,269, filed May 27, 1896.

The object of my present invention is to automatically control the action of said collating-machine by novel electrical appliances used in connection with the mechanisms of the machine, as hereinafter described, and set forth in the claims.

Figure 1:
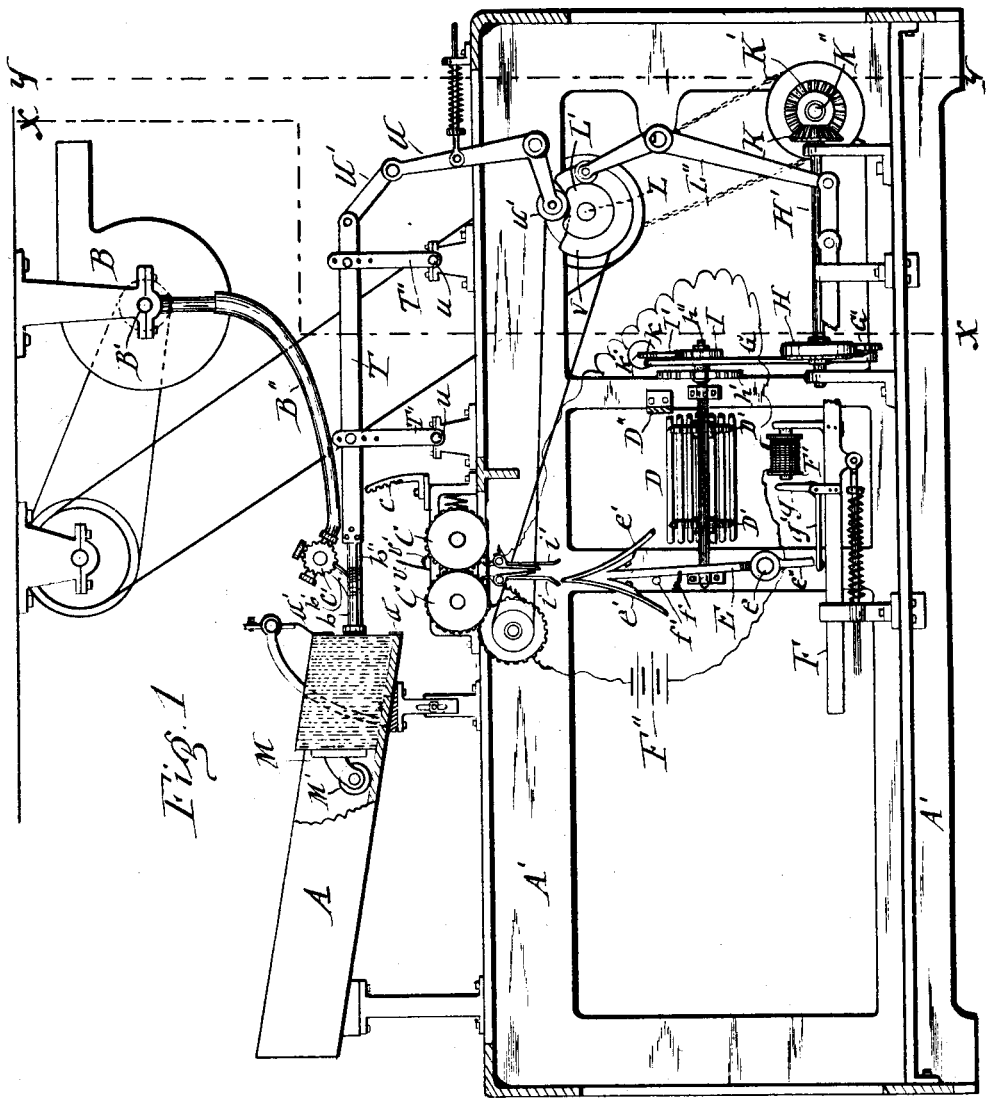
Figure 2:
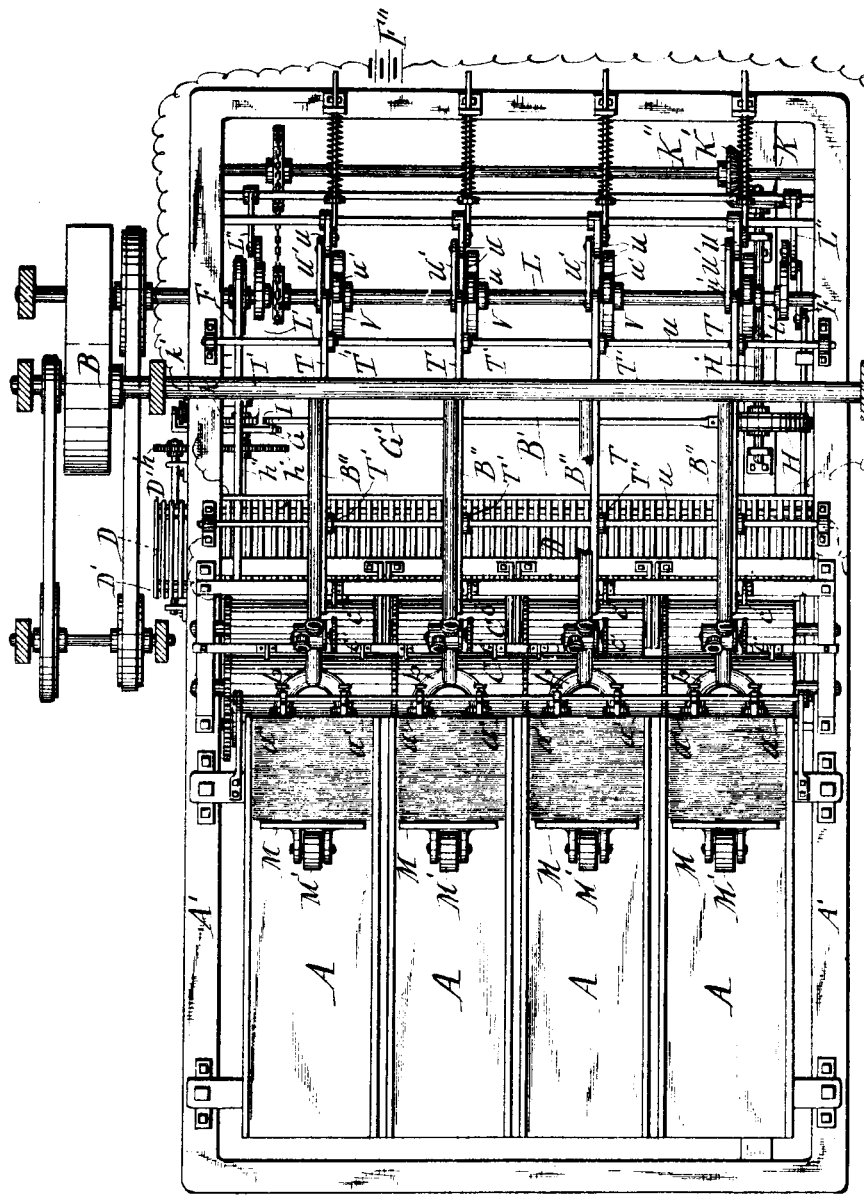
Figure 9:
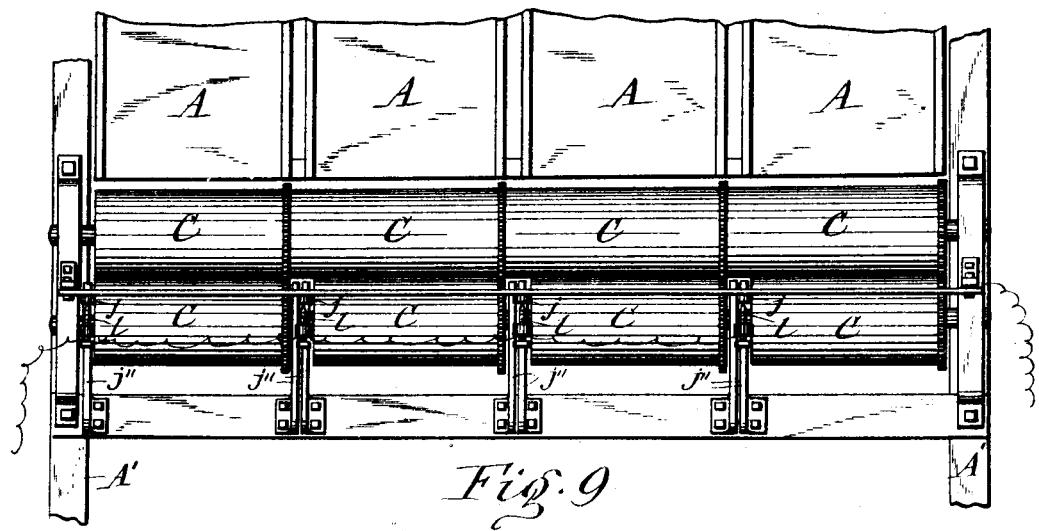
Figure 8:
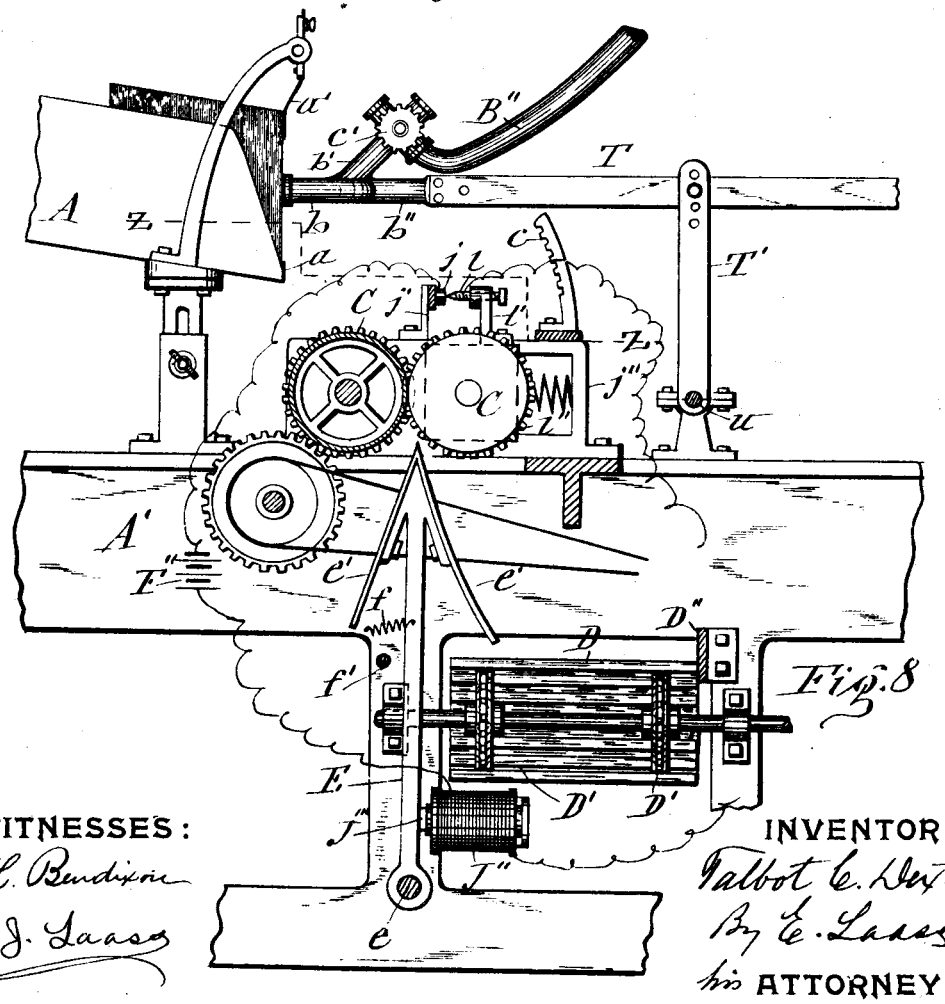
Figure 20:
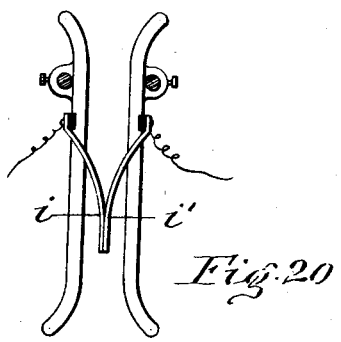
Figure 21:
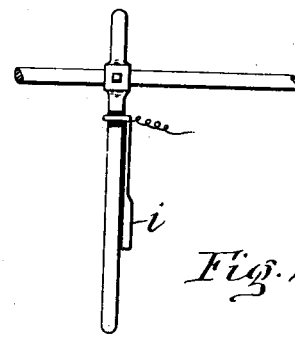
Figure 22:
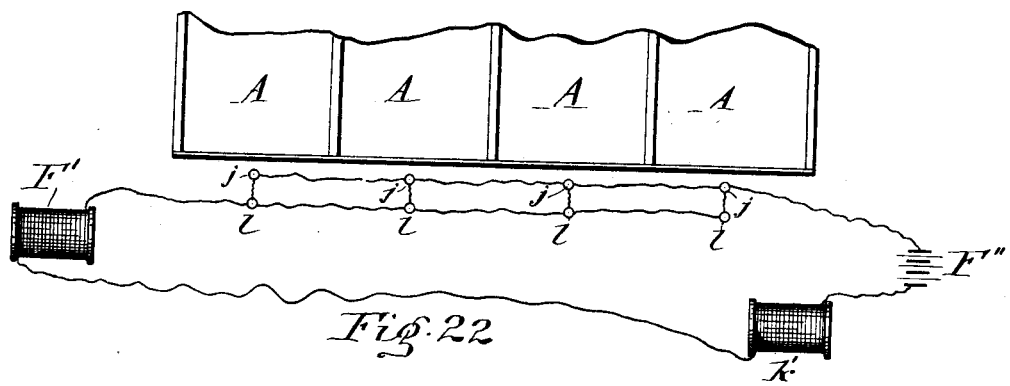
Figure 23:
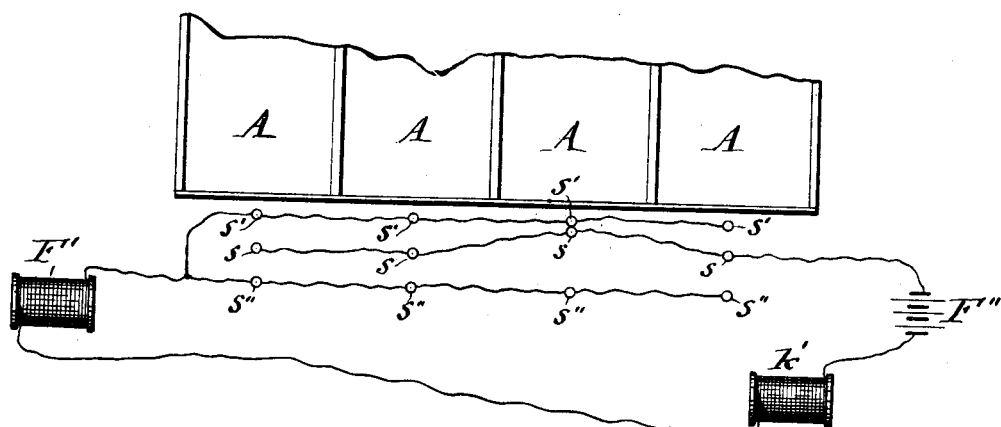

In the annexed drawings, Figure 1 is a vertical longitudinal section of a machine embodying my invention, with the front portion of the main frame broken away to better illustrate the mechanisms. Fig. 2 is a plan view of the same. Figs. 3 and 4 are vertical transverse sections, respectively, on lines X X and Y Y in Fig. 1. Fig. 5 is an enlarged vertical longitudinal section showing in different operative positions one of the devices for transferring the signatures from the hoppers to the gathering-carrier. Figs. 6, 7, 8, and 8½ illustrate modifications of the means employed for automatically switching the signature deliveries to and from the gathering-carrier. Fig. 9 is a plan view in the plane indicated by dotted line Z Z in Fig. 8. Fig. 10 is a vertical transverse section on line W W in Fig. 7. Fig. 11 is a side view of a modification of the circuit maker and breaker which is actuated by the signature in transit. Fig. 12 is a side view of another modification of the aforesaid circuit maker and breaker. Fig. 13 is a vertical sectional view on line V V in Fig. 12. Fig. 14 is an enlarged detached side view of the suction-pipe. Fig. 15 is a top plan view of the same. Fig. 16 is a vertical longitudinal section on line U U in Fig. 15, showing the valve in position to relieve the hose B" from compression by the suction through it when the air is shut off from the nozzle b. Fig. 17 is a sectional view of the aforesaid pipe, showing the three-way cock set to suck the air from the nozzle of the pipe. Figs. 18 and 19 are detail views of the component parts of the three-way cock. Figs. 20 and 21 are enlarged side and edge views of the circuit maker and breaker shown in Fig. 11 of the drawings, and Figs. 22 and 23 are diagrammatic views of the electric circuits.

Similar letters of reference indicate corresponding parts.

A A A represent a series of hoppers which are arranged side by side and in a straight row across the machine. The successive hoppers are designed to contain collectively in consecutive order the signatures to be assembled preparatory to being bound in bookform. These hoppers are inclined toward the discharge end thereof to facilitate the forward movement of the signature, and in order to maintain the signatures in upright positions and at the same time promote the forward movement thereof, I prefer to place in each hopper an upright plate M, which is made to press against the back of the series of signatures by means of a weighted roller M', riding on the bottom of the interior of the hopper. A small upwardly-projecting lip or short pins $a$ on the bottom of the front edge of the hopper bearing on the bottom portion of the first signature of the series in the hopper, and fingers $a'$, bearing on the top portion of the aforesaid first signature, serve to yieldingly confine the signatures in the hopper.

B designates a rotary fan, to which is connected a main suction-pipe B', from which extend a plurality of hose or flexible branch pipes B", one for each hopper A. To each of said branch hose or branch pipes is connected a pipe $b'$, from which extend two nozzles $b$. By means of cams and levers, herein described, said nozzles are made to travel automatically and synchronously in an arc to and from the faces of the series of signatures in the hoppers. I do not, however, limit myself to the use of said fan, as an air-pump may be employed in its stead. When the fan is used, I apply to the pipe $b'$ a three-way cock $d$, which is opened and closed automatically by means of suitable tripping devices in the path of said cock and may consist of a segmental rack $c$, engaging a pinion $c'$, attached to the valve $d'$ of said three-way cock. In the approach of the nozzles to the front signature in the hopper the rack and pinion open the three-way cock, so as to produce a suction through the nozzles $b$, and when brought in contact with the signature in the front end of the hopper it sucks said signature out of the hopper and carries it to a position directly over the rollers C C, and in this latter movement the aforesaid rack and pinion turn the valve of the three-way cock, so as to close the communication between the nozzles and hose and at the same time admit air into the nozzles through branches $d''$ and $d'''$, communicating with a passage $d''''$ in the valve $d'$, and thus release the signature to allow it to be gripped by the rollers, which force the signature downward and cause it to be delivered to the gatherer D, upon which the signatures are successively gathered from all the hoppers preparatory to binding the signatures. The rollers C C are geared together to rotate positively and in unison, so as to propel the signatures to enter between them similar to the folding-rollers of paper-folding machines. In order to insure harmony in the deliveries of the signatures from all the hoppers A A to the aforesaid gatherer D, suitable self-adjusting guides or switch-arms are employed between the rollers and the gatherer, so as to switch the deliveries of the signatures from the gatherer in case more than one signature is delivered at one time from either hopper or one or more of the delivering devices have failed to take a signature from the hopper. The automatic adjustment of the aforesaid switch-arms is effected by electrical appliances, which, together with their coöperating mechanisms, are shown in various forms. In Figs. 1, 2, 3, and 4 of the drawings the aforesaid self-adjusting switch-arms E consist of posts fastened at their lower ends to a shaft $e$ and provided on their upper ends with slanting chutes $e'$, extending in opposite directions from the arms, those on one side of the arm leading to the gatherer D. By tilting the arms E the opposite chutes are thrown into positions under the delivery of the rollers C C, so as to either deliver the signatures to the gatherer D or prevent the signature from being carried onto said gatherer. A suitable spring $f$ holds the arms E normally at rest on a stop $f'$ and in a position to cause the signatures to be delivered to the gatherer D. A downwardly-projecting lug $e''$ is fastened to the shaft $e$, and beneath said lug is a reciprocating pitman F, upon which is mounted an electromagnet F', the armature $g$ of which is pivoted to the pitman and is formed with a dog $g'$, extending lengthwise of the pitman. The magnet and its armature are so arranged that when the armature is attracted the dog $g'$ is caused to strike the lug $e''$ during the reciprocating movement of the pitman and thereby tilt the switch-arms E, so as to cause the descending signature to be conducted away from the gatherer D. For controlling the action of the aforesaid magnet a suitable circuit breaker and maker is arranged to be actuated by the signature in transit from the rollers C C to the switch-arms E. The construction and arrangement of the said circuit maker and breaker is susceptible of numerous modifications.

In Fig. 1 of the drawings the two terminals of the circuit-maker consist of light flexible metallic strips arranged between two guide-fingers $i$ and $i'$, which are interposed between the rollers C C and switch-arms E. Said terminals are normally in contact with each other and thus close the circuit, which causes the magnet F', by means of its armature $g$ and dog $g'$, to tilt the switch-arm E to a position to carry the descending signature away from the gatherer D. When, however, the suction-nozzles $b$ bring down a single signature, the passage of the latter between the aforesaid terminals breaks the circuit, and thus causes the magnet F' to release its armature, and therefore the dog $g'$ is prevented from engaging the lug $e''$. The switch-arm E is then drawn over by the spring $f$, so as to guide the descending signature onto the gatherer D. The pitman F receives a positive motion from the driving-shaft L of the machine by suitable mechanism, which in this instance is represented as consisting of a cam L', attached to said shaft and imparting oscillatory motion to a lever L'', connected to the aforesaid pitman, as shown in Fig. 1 of the drawings.

The signature-gatherer D consists of two endless chains running on sprocket-wheels D', mounted on transverse shafts, which receive intermittent rotary motion in the manner hereinafter described. To the said chains are secured transversely a series of slats arranged sufficiently near each other to properly support the signatures delivered thereto by the switch-arms E. Along the side of the gatherer D farthest from the switch-arms extends a plate D'', against which the delivered signatures abut. To the end of the shaft of one of the pair of sprocket-wheels D' is secured a pinion $h$, which meshes with the gear-wheel $h'$, fastened to a counter-shaft $h''$, which is parallel with the aforesaid sprocket-wheel shaft. To said counter-shaft is also permanently secured a ratchet-wheel I, and at the side of the said ratchet-wheel is a lever G, which is fulcrumed on the counter-shaft and has a short arm extending above the said shaft and has pivoted to it a pawl I', which is adapted to engage the aforesaid ratchet-wheel. This pawl is formed with an armature $k$, facing an electromagnet $k'$, firmly sustained on the aforesaid lever. This magnet is in the same electric circuit with the magnet F', the battery of which circuit is designated at F''. Hence said magnets are caused to operate in unison. The lever G receives oscillatory motion by means of a reciprocating pitman G', connected at one end to the free end of said lever and at the opposite end to the eccentric-strap of the eccentric H, which is mounted on a shaft H', to which is fastened a miter-pinion K, meshing with a corresponding pinion K', fastened to a transverse shaft K'', which receives rotary motion from the main driving-shaft L either by means of sprocket chains or wheels, as shown, or by a suitable train of gears, as may be deemed most convenient.

The motion of the gatherer D is controlled as follows: The electric circuit being normally closed by the contact of the two terminals $i$ and $i'$, as hereinbefore stated, the magnet $k'$ is energized and thereby caused to hold the dog I' out of engagement with the ratchet-wheel I during the oscillation of the lever G, and thus the gatherer D remains at at rest. As the suction-nozzles $b$ $b$ bring down signatures from each of the hoppers A A said signatures are forced down by the rollers C C, and in passing between the terminals $i$ and $i'$ they break the circuit, and therefore the magnet $k'$ is caused to release its armature and allow the pawl to engage the ratchet-wheel I, and consequently the lever G is caused to impart intermittent rotary motion to the counter-shaft $h''$, which, by means of the gear-wheel $h'$ and pinion $h$, transmits motion with increased speed to the gatherer D, which is thereby caused to shift longitudinally a distance equal to that between the centers of two adjacent hoppers.

Fig. 6 of the drawings illustrates a simpler means for actuating the switch-arm E. It consists in the employment of an electromagnet J, firmly secured to the frame A' of the machine and having its armature J' fastened to the shaft $e$, to which the aforesaid switch-arm is attached. A similar means for operating the aforesaid switch-arm is illustrated in Fig. 8 of the drawings, in which the magnet J'' is placed at right angles to the switch-arm, to the side of which is attached the armature J'''. The circuit maker and breaker may be arranged to be actuated by a lateral movement of one or both of the rollers C C, produced by the passage of the signature between the said rollers. This latter movement of the circuit maker and breaker is illustrated in different forms in the drawings.

In Figs. 7, 8, and 8½ of the drawings one of the terminals of each of the circuit makers and breakers required for the plurality of signature-delivering hoppers is stationary and secured to a cross-bar $j$, attached to the brackets $j'$, mounted on the two journal-box frames $j''$ at opposite sides of the main frame A'. The other terminals $l$ are adjustably connected to brackets $l'$, mounted on the movable box $l''$ of the laterally-yielding roller C. All the rollers at one side of the bite are mounted on a single shaft completely across the machine and journaled in stationary boxes. The rollers on the opposite side of the bite are each mounted on a separate shaft journaled in the laterally-movable boxes $l''$, on which the terminals $l$ of the circuit maker and breaker are carried, as before stated.

Fig. 7 of the drawings also shows a modification of the arrangement for switching the signatures to and from the gatherer D. In this case the signature-guiding chutes $e'$ are attached to a stationary support E', and the switching of the signatures is effected by rigidly securing the guiding-fingers $i''$ and $i'''$ to transverse shafts $n$ $n$, pivoted to opposite sides of the main frame A', and coupled together at their lower ends by straps $n'$, pivotally connected thereto. To one end of the shafts $n$ is also fastened an arm $m$, to which is secured the armature $m'$ of the magnet $m''$, which is in circuit with the circuit makers and breakers $j$ and $l$. The circuit being normally closed causes the magnet to attract the lever $m$ and thereby swing the guiding-fingers $i''$ and $i'''$ to one side, so as to prevent the signatures from passing to the gatherer D, as shown. When, however, a signature passes between the rollers C C, the circuit is broken and the magnet is caused to release its armature, and then the guiding-fingers $i$ and $i'$ are swung by gravity toward the opposite side and cause the signature to be delivered to the gatherer D.

Another modification of the circuit maker and breaker is shown in Fig. 11 of the drawings, and consists of an arm M''', pivoted at its lower end to the base of the stationary bracket M'' and provided with a vertical slot N, into which projects a pin N', attached to one of the sliding boxes N'', in which the shaft of one of the rollers C is journaled. To the upper end of the arm M''' is connected the electric terminal $o$, which projects from opposite sides thereof and faces two terminals $o'$ and $o''$, attached to a metal bracket $o'''$, which is mounted on the post of the bracket M'' and insulated therefrom, as shown at $p$. The effect of this duplex circuit maker and breaker is as follows: In case no signature passes between the rollers C C the circuit is closed at the terminal $e'$. If a single signature passes between the rollers the sliding movement imparted to the journal-boxes N'' of one of said rollers causes the arm M''' to break the circuit at $o'$, and if two or more signatures pass simultaneously between the rollers the arm M''' receives a further movement from the sliding box N'' and is thereby caused to close the circuit at the terminal $o''$.

The modification shown in Fig. 12 of the drawings consists in pivoting the shaft $r$ of the roller C to arms P, which are suspended from a shaft $r'$, extending across the machine and supported on posts R, secured to the sides of the frame A'. One of the arms of each pair is extended above the shaft $r'$ and carries on said extension the two terminals $s$ $s$, which are united and face in opposite directions and toward the two terminals $s'$ $s''$, which are supported on brackets $t$ $t$, mounted on cross-bars $t'$ $t'$, secured to posts $t''$ $t''$ on the sides of the frame A'. In this case the circuit is normally closed at $s''$, and the lateral movement imparted to the roller C by the passage of a single signature between the two rollers causes the arm P to break the circuit at $s''$ without closing the circuit at $s'$. If, however, more than one signature passes between the rollers, the arm P is tilted sufficiently to cause it to close the circuit at $s'$. Hence the hereinbefore-described signature-switching devices are caused to cast the signatures from the gatherer D and arrest the motion of said gatherer when the machine fails to deliver a signature from one or more of the hoppers A, as well as when more than one signature at a time is delivered from either hopper, and the gatherer D is operated and the signature-switching devices adjusted to deliver the signatures to the gatherer only when a single signature is delivered from each hopper A at the same time. This assures accurate gathering of the signatures in proper order to be bound. The arrangement of the aforesaid electric circuits is illustrated diagrammatically in Figs. 22 and 23 of the drawings.

Various means may be employed for carrying the suction-nozzles back and forth between the front ends of the hoppers A A and bite of the rollers C C. I deem the following as the simplest and most efficient mechanism for that purpose, to wit: The backs of said nozzles are formed with a shank $b''$, which is attached to the end of a horizontal bar T, pivoted to and supported by parallel arms $T'$ $T'$, of equal length, connected to and rising from shafts $u$, which extend across the machine and are supported on suitable brackets secured to the frame $A'$. The bar T receives a reciprocating motion from a bell-crank U, to one arm of which the said bar is connected by a link $U'$. The other arm of said lever has pivoted to it a roller $u'$, by which it bears on a cam V, secured to the driving-shaft L. Said cam imparts an oscillatory motion to the lever and thereby transmits a reciprocating motion to the bar T, which is caused to move in an arc in a vertical plane, as more clearly illustrated in Fig. 5 of the drawings. To further insure the release of the signature from the nozzles $b$ at the point of delivery to the rollers C C, I prefer to employ the strippers $v$, consisting of fingers sustained on a cross-bar $v'$ and in position to push the signature from the nozzle at the aforesaid point, as illustrated in Fig. 5 of the drawings.

It is obvious that the devices for automatically switching the signatures either to or from the gatherer D are adapted to be used in connection with various means for delivering the signatures from the hoppers. Hence I do not limit myself to the use of the pneumatic suction-pipe in connection with said switching devices.

What I claim as my invention is—

1. A book-collating machine comprising in connection with a plurality of signature-hoppers, a signature-gatherer, and means for delivering the signatures from the hoppers toward the gatherer, switch-arms disposed to receive the signatures in transit from the respective hoppers and movable to conduct the signatures either to or from the gatherer and controlled automatically in their conducting positions by the signatures in transit.

2. A book-collating machine comprising in combination with the signature-hoppers, a traveling signature-gatherer and means for delivering the signatures from the hoppers to said gatherer, switch-arms movable to conduct the signatures either to or from the gatherer, an electric circuit, a magnet in said circuit controlling the positions of said switch-arms, and separate sets of circuit makers and breakers actuated by the signatures in transit from the respective hoppers to the gatherer.

3. In combination with the signature-hoppers, a traveling signature-gatherer, means for delivering the signatures from the hoppers to said gatherer and mechanism imparting motion to the gatherer an electric circuit, a magnet in said circuit controlling the action of said mechanism, and separate sets of circuit makers and breakers actuated by the signatures in transit from the respective hoppers to the carrier.

4. In combination with the signature-hoppers, a traveling signature-gatherer, means for delivering the signatures from the hoppers to said gatherer, switch-arms movable to conduct the signatures either to or from the gatherer, and mechanism imparting motion to the gatherer, an electric circuit, magnets in said circuit controlling the positions of said switch-arms and the action of the gatherer-actuating mechanism, and separate sets of circuit makers and breakers actuated by the signatures in transit from the respective hoppers as set forth.

5. In combination with the signature-hoppers, a traveling signature-gatherer and means for removing the signatures from said hoppers, rollers disposed side by side and geared to receive positive rotary motion, said rollers receiving between them the aforesaid signatures and propelling the same toward the gatherer and switch-arms controlled by the signatures in transit to conduct the signatures either to or from the gatherer as set forth.

6. In combination with the signature-hoppers, a traveling signature-gatherer and means for removing the signatures from the hoppers, rollers disposed side by side and geared to receive positive rotary motion and disposed to receive and propel the aforesaid signatures, switch-arms supported movably to deliver the signatures from said rollers either to or from the gatherer, mechanism imparting motion to said gatherer, an electric circuit, magnets in said circuit controlling the positions of the aforesaid switch-arms and the action of the gatherer-actuating mechanism, and separate sets of circuit makers and breakers actuated by the signatures in transit from the respective hoppers to the switch-arms as set forth.

7. In combination with the signature-hoppers, means for removing the signatures from said hoppers and a traveling gatherer for receiving the delivered signatures, switch-arms movable toward and from the said carrier and provided with chutes extending in opposite directions from said arms to deliver the signatures either to or from the gatherer, a spring forcing the switch-arms in one direction, a reciprocating pitman, an electric circuit, a magnet in said circuit mounted on the pitman, a dog actuated by the armature of said magnet and adapted to tilt and release the aforesaid switch-arms during the movement of the pitman and a circuit maker and breaker actuated by the signatures in transit to the gatherer as set forth.

8. In combination with the signature-hoppers, means for removing the signatures from the hoppers, and a traveling gatherer for receiving the delivered signatures, rollers receiving the signatures and propelling the same toward the carrier, switch-arms movable toward and from the gatherer and provided with chutes extending in opposite directions from the arms to deliver the signatures from the rollers either to or from the gatherer, a spring forcing the switch-arms in one direction, a reciprocating pitman, an electric circuit, a magnet in said circuit carried on the pitman, a dog actuated by the armature of said magnet and caused thereby to tilt the aforesaid switch-arms, during the movement of the pitman and separate circuit makers and breakers actuated respectively by the signatures in transit from the different hoppers as set forth.

9. In combination with the signature-hoppers, means for removing the signatures from said hoppers, and a traveling gatherer for receiving the delivered signatures, positively-revolving rollers disposed side by side to receive the signatures between them and propel the same toward the gatherer, the rollers at one side of the bite being journaled in laterally-yielding boxes, switch-arms conducting the signatures from said rollers either to or from the aforesaid gatherer, a spring forcing said switch-arms in one direction, a reciprocating pitman, an electric circuit, a magnet in said circuit carried on the pitman, the armature pivoted to the pitman and provided with a dog adapted to move the aforesaid switch-arms in opposition to the spring, and a circuit-controller having one terminal stationary and the coöperating terminal carried on the laterally-yielding journal-box of the aforesaid roller as set forth.

10. In combination with the signature-hoppers, means for removing the signatures from said hoppers, and a traveling gatherer for receiving the delivered signatures, rollers receiving between them the signatures, the rollers at one side of the bite being journaled in laterally-yielding boxes, switch-arms supported movable laterally to conduct the signatures from the rollers either to or from the gatherer, an electric circuit, a magnet in said circuit controlling the position of the aforesaid switch-arms, a pivoted arm actuated by the sliding movement of one of the aforesaid journal-boxes, and a circuit-controller actuated by said arm as set forth.

11. In combination with the signature-hoppers, means for removing the signatures from the hoppers, and a traveling gatherer for receiving the removed signatures, which gatherer is supported by and receives motion from wheels fixed to their shafts, a pawl and ratchet transmitting motion to said gatherer, an electric circuit, a magnet in said circuit controlling the action of said pawl, a switch-arm for conveying the signature either to or from the gatherer, a magnet in the aforesaid circuit controlling the position of the guide, and a circuit-controller actuated by the signature in transit to said switch-arm as set forth.

12. In combination with a plurality of signature-hoppers, an intermittently-traveling signature-gatherer, pneumatic suction-pipes carried to and from the respective hoppers to draw the front signatures from said hoppers and carry said signatures to the points of delivery to the gatherer and switch-arms guiding the signatures either to or from the gatherer and controlled by the signatures in transit, as set forth.

13. In combination with a plurality of signature-hoppers and the traveling signature-gatherer, pneumatic suction-pipes carried synchronously to and from said hoppers to draw the front signatures from all of said hoppers toward said gatherer, strippers removing the signatures from said pipes, and switch-arms for guiding the signatures either to or from the gatherer and controlled by the signatures in transit, as set forth.

14. In combination with a plurality of signature-hoppers, an intermittently-traveling signature-gatherer, pneumatic suction-pipes carried synchronously to and from said hoppers to draw a signature from each hopper, positively-rotated rollers disposed side by side and receiving the signatures from the suction-pipes and forcing the signatures toward the gatherer, and switch-arms controlling the delivery of the signatures either to or from the gatherer and controlled by the signatures in transit.

15. In combination with a plurality of signature-hoppers, an intermittently-traveling signature-gatherer, pneumatic suction-pipes carried synchronously from the fronts of the hoppers and in vertical planes parallel to the longitudinal central lines of the hoppers, valves connected to said pipes, and trippers in the paths of the valves to automatically open and close said valves during the movements of the pipes to and from the hoppers and thereby cause said pipes to draw the front signatures from the hoppers and discharge them at the points of delivery to the gatherer as set forth.

16. In combination with the main supporting-frame and a plurality of signature-hoppers disposed side by side and in a row across the said frame, the signature-gatherer moving intermittently crosswise the delivery ends of the hoppers, two parallel shafts extending across the frame, arms arranged in pairs mounted on said shafts at points in lines parallel with the respective hoppers, bars pivotally connected to the pairs of arms and carried thereby endwise toward and from the hoppers, pneumatic suction-pipes connected to the ends of said bars adjacent to the hoppers to draw the signatures therefrom, and oscillatory bell-cranks imparting reciprocating motion to said bars, as set forth.

TALBOT C. DEXTER. [L. S.]

Witnesses:
JAS. A. WHITLOCK,
V. E. MARSH.